(12) United States Patent
Murakami

(10) Patent No.: US 7,916,236 B2
(45) Date of Patent: Mar. 29, 2011

(54) DISPLAY DEVICE AND METHOD OF REPAIRING THE SAME INCLUDING TRANSMITTING AND REFLECTING REGIONS AND AN OPAQUE CONDUCTIVE FILM BELOW A CONNECTING PORTION

(75) Inventor: Katsuaki Murakami, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 9 days.

(21) Appl. No.: 11/557,585

(22) Filed: Nov. 8, 2006

(65) Prior Publication Data

US 2007/0121040 A1    May 31, 2007

(30) Foreign Application Priority Data

Nov. 29, 2005   (JP) ................................ 2005-343553

(51) Int. Cl.
*G02F 1/1333* (2006.01)
*G02F 1/1343* (2006.01)
*G02F 1/1335* (2006.01)
*G02F 1/13* (2006.01)

(52) U.S. Cl. ............ 349/55; 349/54; 349/114; 349/192

(58) Field of Classification Search .................. 349/114, 349/55, 54, 192
See application file for complete search history.

(56) References Cited

U.S. PATENT DOCUMENTS

| 6,710,827 B2 * | 3/2004 | Kubo et al. ...................... 349/55 |
| 7,133,094 B2 * | 11/2006 | Ogawa et al. .................. 349/114 |
| 7,242,442 B2 * | 7/2007 | Nakajima et al. ............... 349/54 |
| 2002/0180911 A1 * | 12/2002 | Iijima ............................ 349/114 |
| 2005/0036088 A1 | 2/2005 | Okumura |
| 2006/0232722 A1 * | 10/2006 | Huang et al. .................... 349/54 |

FOREIGN PATENT DOCUMENTS

| JP | 5-249488 | 9/1993 |
| JP | 2000-292808 | 10/2000 |
| JP | 2004-198718 | 7/2004 |
| JP | 2005-209691 | 8/2005 |

* cited by examiner

*Primary Examiner* — Mark A Robinson
*Assistant Examiner* — Paisley L Arendt
(74) *Attorney, Agent, or Firm* — Oblon, Spivak, McClelland, Maier & Neustadt, L.L.P.

(57) ABSTRACT

A display device has a pixel including a transmitting region to transmit light and a reflecting region to reflect external light. The display device includes: a transparent conductive film containing a first transparent conductive film forming a pixel electrode in the transmitting region, a second transparent conductive film provided as an upper layer of a reflecting electrode forming the reflecting region, and a connecting portion integrally formed with and connecting the first transparent conductive film and the second transparent conductive film; and a opaque conductive film provided as a lower layer of the transparent conductive film, and located below an area of the transparent conductive film including the connection portion.

12 Claims, 3 Drawing Sheets

DISPLAY DEVICE AND METHOD OF REPAIRING THE SAME INCLUDING TRANSMITTING AND REFLECTING REGIONS AND AN OPAQUE CONDUCTIVE FILM BELOW A CONNECTING PORTION

BACKGROUND OF THE INVENTION

1. Field of the Invention

The present invention relates to a display device and a method of repairing the same. More particularly, the present invention relates to a display device and a method of repairing the same which is preferably applied to a method of repairing a defective pixel in a semi-transmission type display device.

2. Background Art

Recently, flat panel displays (FPD) such as liquid crystal displays have been widely applied to monitors for personal computer use, monitors for television use and monitors for portable terminal use. Especially, in the field of mobile phones, portable type terminal devices have made a rapid progress. It is important that the portable type terminal devices are compact and capable of driving over a long period of time. In view of the above circumstances, a semi-transmission type display device is watched with keen interest, which is capable of saving electric power consumption in such a manner that the display device displays an image with a back-light as usual under a dark environment and that the display device displays an image by utilizing a peripheral environment light (external light) without using the back-light under a bright environment. For example, a semi-transmission type liquid crystal display device and a method of manufacturing the same is disclosed in Japanese Patent Publication No. 2003-255331.

The semi-transmission type display device includes a reflecting plate (reflecting electrode) in one portion of its display area so that light sent from the peripheral environment can be reflected by the reflecting plate. In many cases, this reflecting plate comprises the same thin metallic film arranged in a pixel as that of a scanning line or a video signal line. A thickness of a region, in which the reflecting plate is arranged, is larger than a thickness of a region, in which the reflecting plate is not arranged, in the direction of height. Therefore, a gap (referred to as "a panel interval" hereinafter) between an insulating board (array board), on which the scanning line and the video signal line are formed, and a color filter board, which is arranged being opposed to the array board, is reduced. When the panel interval is reduced and when foreign objects generated in the manufacturing process are attached to a portion between the panels before the process in which the array board and the color filter board are bonded to each other, defects of short-circuit are increased because of the existence of the foreign objects between the panels. In the case where a short-circuit is caused and a pixel electrode on the array board and an opposing electrode on the color filter board are electrically continued to each other, defects of luminescent spots are caused on the display having a structure of the normally white mode. Accordingly, for the above structural reason, the semi-transmission type display device is disadvantageous in that defects of luminescent spots, which are caused by the existence of foreign objects, are increased.

Recently, high quality is required for the product of a display device. Especially, when defects of luminescent spots are generated in the display device, it will be immediately rejected as a defective product. In order to repair the above defect of the luminescent spot, a first method of repairing the display device is provided, in which repairing is conducted by connecting a picture electrode with a gate electrode (a scanning line). According to this repairing method, a repaired pixel is given a predetermined gate-off potential. Therefore, it is expected that the repaired portion becomes a black spot. An example of this method is disclosed in Japanese Patent Publication No. H05-249488.

In order to repair the above defect of the luminescent spot, a second method of repairing the display device is provided, which will be described as follows. Recently, investigations have been made into a structure in which even when a defect of short-circuit is generated because of the existence of foreign objects, only the short-circuited region can be separated from the other pixel electrode. Especially, in the semi-transmission type display device, patterning is conducted in some cases so that a pixel electrode on the uppermost layer in the reflecting region, in which there is a high possibility that defects of short-circuit are generated by foreign objects because the panel interval is small, can be separated. Due to the above stricture, even when foreign objects are attached onto the reflecting region, the panel interval of which is small, and the array board and the color filter board are short-circuited to each other, it is possible to separate the pixel electrode of the reflecting region from the other region (the transmitting region) by cutting off the defective portion.

When the reflecting region, in which foreign objects exist, is repaired, the reflecting region remains as a luminescent spot. However, with respect to the transmitting region, it is possible to normalize it, which means that the reflecting region is visualized as a luminescent spot in the reflection display state, however, the reflecting region is not visualized as a luminescent spot in the transmission display state. As compared with the luminescent spot in the reflecting display state, the luminescent spot in the transmitting display state is a serious defect. Therefore, when the problem of the luminescent spot in the transmitting display state is solved, the number of defective products can be greatly decreased.

However, in the first method of repairing the display device described above, depending upon the V-T characteristic (Voltage-Transmission characteristic) of the liquid crystal to be used, when OFF voltage of the gate signal is impressed upon the liquid crystal, the transmittance is raised in some cases. As a result, the following problem is encountered. It is impossible to change the repaired pixel into a perfect black spot, that is, the repaired pixel can be only changed into a defective spot having some luminance.

In the second method of repairing the display device described above, the repairing work of repairing the defect is usually conducted after the panels have been assembled (after the array board and the color filter board have been bonded to each other) in many cases. In this case, it is necessary to irradiate a laser beam from a reverse side of the array board (a side opposite to the face opposed to the color filter board on the array board). However, the following problems may be encountered in the irradiation of the laser beam. In general, the pixel electrode includes ITO (Indium Tin Oxide) which is a transparent conductive film. However, the transparent conductive film is characterized in that a laser beam transmits through the transparent conductive film. Accordingly, in order to cut off the transparent conductive film, it is necessary to irradiate a very high intensity of laser beam. The very high intensity of laser beam penetrates the transparent conductive film and reaches the color filter board which is arranged being opposed. Therefore, the counter electrode formed on the face opposed to the array board on the color filter board, the laser beam machining of which is not necessary, is damaged. When the counter electrode is damaged on the color filter board, by an influence of the scattered scraps (foreign objects), the array board and the color filter board are short-circuited to each other, and a defect is generated again. When a black matrix portion, which is a shading region of the color filter board, is damaged, light leaks out from the thus damaged shading region at the time of lighting, which can be a cause of a defective product.

SUMMARY OF THE INVENTION

The present invention has been accomplished to solve the above problems. An object of the present invention is to provide a semi-transmission type display device and a method of repairing the same capable of positively repairing a luminescent spot defect without further generating a defect.

According to an aspect of the present invention, a display device having a pixel including a transmitting region to transmit light and a reflecting region to reflect external light, the display device comprises: a transparent conductive film including a first transparent conductive film forming a pixel electrode in the transmitting region, a second transparent conductive film provided as an upper layer of a reflecting electrode forming the reflecting region, and a connecting portion integrally formed with and connecting the first transparent conductive film and the second transparent conductive film; and a opaque conductive film provided as a lower layer of the transparent conductive film, and located below an area of the transparent conductive film including the connection portion.

According to the present invention, it is possible to positively repair a defective product caused by a pixel defect such as a luminescent spot defect in a semi-transmission type display device.

BRIEF DESCRIPTION OF THE DRAWINGS

The present invention may be more readily described with reference to the accompanying drawings.

DETAILED DESCRIPTION OF THE PREFERRED EMBODIMENTS

First Embodiment

Figure 1:
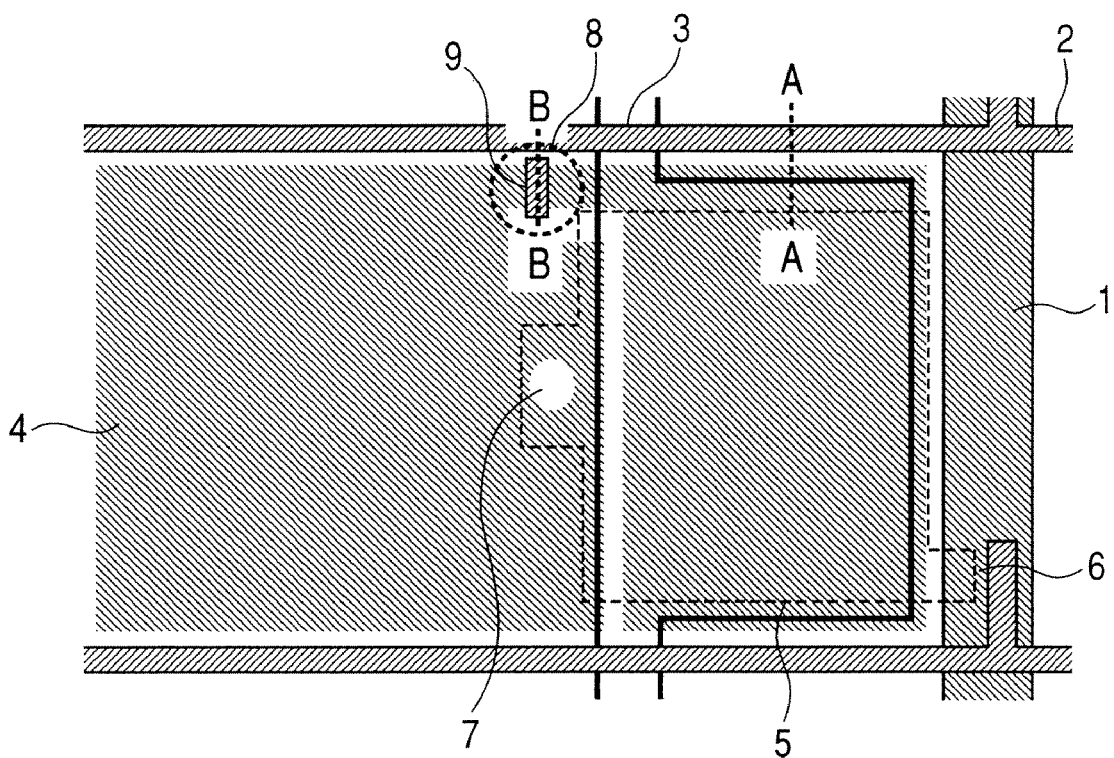
FIG. 1 is a plan view of a substantial one pixel in the First Embodiment of the present invention.
Figure 2:
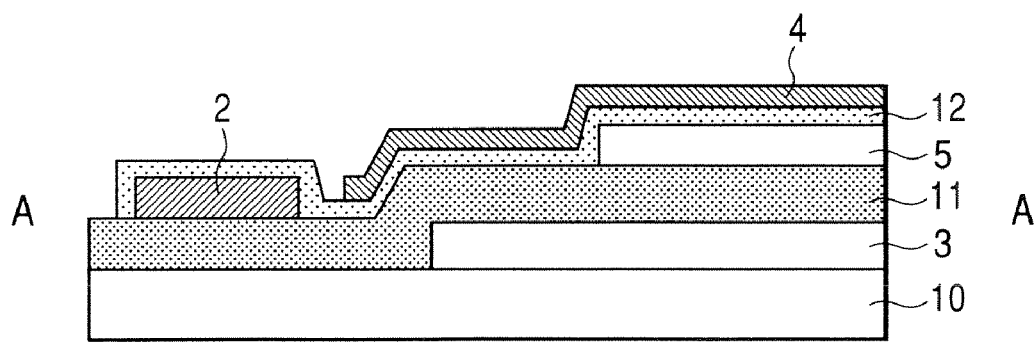
FIG. 2 is a sectional view taken on line A-A in FIG. 1.
Figure 3A:
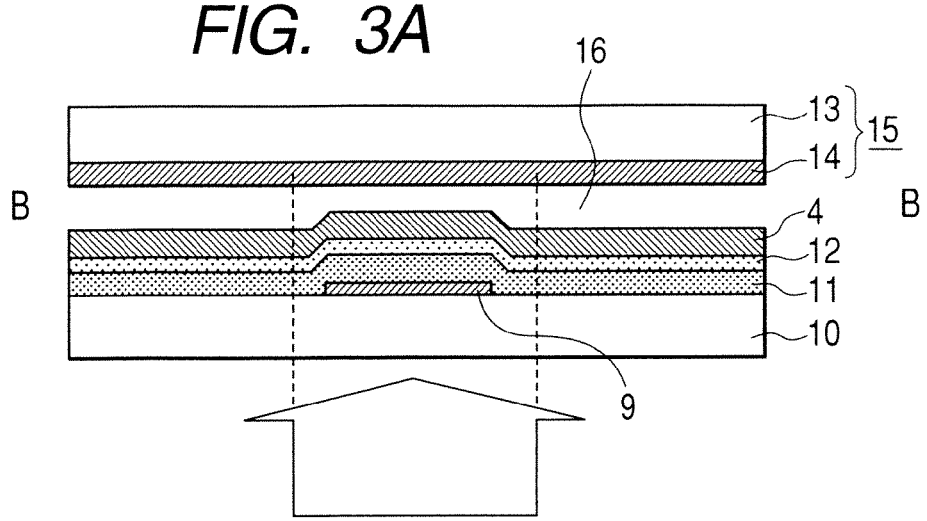
FIGS. 3A to 3C are sectional views taken on line B-B in FIG. 1.
Figure 3B:
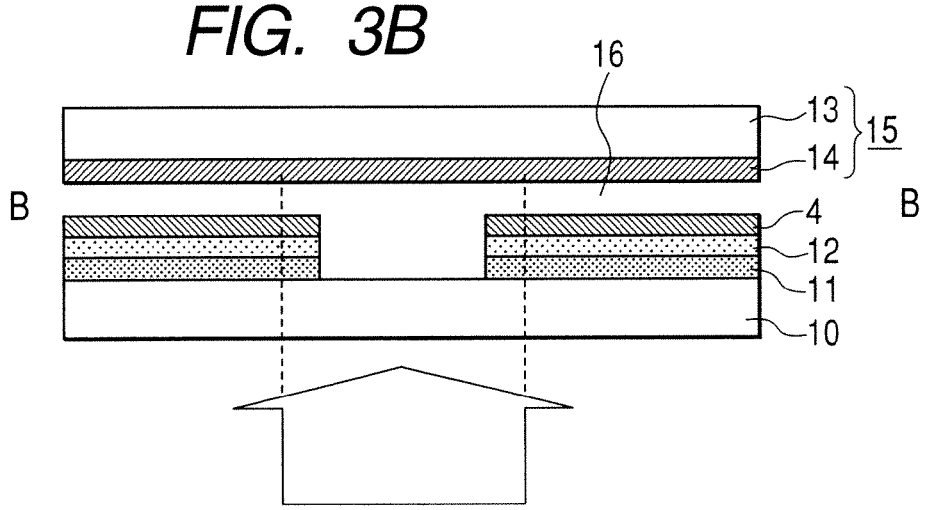
Figure 3C:
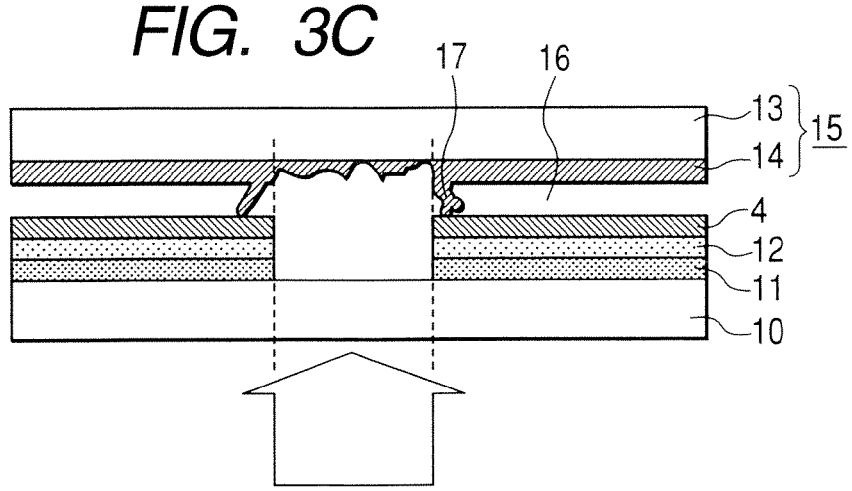

Referring to FIGS. 1 to 3, the First Embodiment of the present invention will be explained below. FIG. 1 is a plan view of a substantial one pixel in Embodiment 1 of the present invention, FIG. 2 is a sectional view taken on line A-A in FIG. 1, and FIGS. 3A to 3C are sectional views taken on line B-B in FIG. 1.

In FIG. 1, a common wiring 3 is formed in parallel with a scanning line (gate wiring) 1 formed on an insulating board (array board) 10. A video signal line (source line) 2 is formed in a direction perpendicular to the scanning line 1 and the common line 3 while an insulating film 11 is being interposed between the video signal line 2 and the scanning line 1 and common lines 3. A substantial left half region of FIG. 1 corresponds to the transmitting region in the semi-transmission type display device. In the transmitting region, a pixel electrode 4 including a transparent conductive film such as ITO is formed. In the reflecting region, which is a substantial right half portion of FIG. 1, a reflecting electrode 5 is formed which is connected to a drain electrode of a thin film transistor (TFT) 6. A protrusion is formed in the common wiring 3 at the center of one pixel so that an area of the common wiring 3 can be increased in order to form an accumulated capacity between the reflecting electrode 5 and the common wiring 3 which serves as a common electrode.

In the semi-transmission type display device as described above, when foreign objects are generated in the process of manufacturing the insulating board 10, the following problems may be encountered. Especially, since the reflecting electrode 5 and the common electrode in the common wiring 3 are formed in the reflecting region, a height from the surface of the insulating board 10 is increased. Therefore, in the case where a color filter board 15, which is arranged being opposed to the insulating board 10, is bonded while the foreign objects are being located at this position, a short circuit is caused between the insulating board 10 and the counter electrode 14 formed on a surface opposed to the liquid crystal 16 of the color filter board 15. Therefore, in the structure shown in FIG. 1, the first transparent conductive film, which forms a pixel electrode 4 of the transmitting region, and the second transparent conductive film, which is formed on an upper layer of the reflecting electrode 5 which is a metallic film forming the reflecting region and corresponds to the pixel electrode 4, are connected to each other at a cutting portion 8 (an example of a connecting portion) by a transparent conductive film formed integrally with the first and the second transparent conductive film. The pixel electrode 4 is connected with the reflecting electrode 5 through a contact hole 7 formed in a protective film 12. In the cutting portion 8, a cutting pattern 9, which is formed out of a opaque conductive film independently formed on the lower layer, is formed. The cutting pattern can be formed out of a film made of Al, Cr or Mo or the compound material. In this connection, in FIG. 1, in order to make the effective voltage, which is impressed upon the liquid crystal 16 in the reflecting region, agree with that of the transmitting region, a transparent conductive film is formed on an upper layer of the reflecting electrode 5 in the reflecting region and on the substantial front face.

In the case where foreign objects are attached to the reflecting region as described before and a defective spot is caused by a failure of short-circuit between the color filter board 15 and the insulating board 10 and it is necessary to cut off the cutting portion 8, laser beam irradiation can be conducted upon the cutting pattern 9 in the cutting portion when the above structure is adopted. In the case where no cutting pattern 9 is provided in the cutting portion 8 and only a transparent conductive film such as ITO is provided, unless an intensity of the laser output is strongly increased, it is impossible to conduct cutting. However, when the cutting pattern 9 is provided, it becomes possible to conduct cutting with a low intensity of the laser output. For example, an intensity of the laser output necessary for cutting only the transparent conductive film is approximately 1.0 mJ/pulse. However, when the cutting pattern 9 is arranged, it becomes possible to conduct cutting with a low intensity of the laser output of 0.3 mJ/pulse. The reason why a very high intensity of the laser output is needed is that the transparent conductive film to be cut is made of material which is difficult to absorb a laser beam. In the case of a opaque metal, it is easy to absorb energy of a laser beam. Therefore, even when an intensity of the laser output is low, it is possible to conduct cutting. The laser used here is a commonly used YAG laser. It is preferable that the wave-length is the same as that of the fundamental wave (1064 nm). However, it is also possible to conduct repairing with the second higher harmonics (532 nm) or the third higher harmonics (355 nm). Although it is different according to the structure of the array board, it is preferable to use the laser output in a range from 0.01 mJ/pulse to 10 mJ/pulse.

When a laser beam is irradiated onto a opaque conductive film including metal, the metallic film is suddenly heated by laser beam energy. Therefore, the metallic thin film is destroyed like as being sublimated. As shown in FIG. 3A, on an upper layer of the cutting pattern 9, the transparent conductive film 4 including ITO is formed via the insulating film 11 and the protective film 12. However, by the expansion energy generated at the time of sublimation, the insulating film 11 and the protective film 12 of the transparent conductive film on the upper layer are flown. As a result, concerning the energy for cutting only the transparent conductive film, the transparent conductive film can be cut off with a low intensity of energy. Even when a laser beam irradiating range is set wider than the cutting pattern 9, in order to cut only the transparent conductive film, it is necessary to supply a very high intensity of laser beam energy as described above. Therefore, in the case where a laser beam of a low intensity of output energy is irradiated, as shown in FIG. 3B, it becomes possible to selectively cut only the transparent conductive film on the cutting pattern 9. Since the transparent conductive film can be cut with a low intensity of laser beam energy as described above, the color filter board 15 including the counter board 13 and the counter electrode 14 can be seldom affected by the laser beam. Accordingly, scattered objects 17 are not generated which give a bad influence on the counter electrode 14 provided on the color filter board 15 side as shown in FIG. 3C in the case where an intensity of the laser output is very high.

In this embodiment of the present invention, the defect is repaired in a panel state in which the array board and the color filter board have been bonded to each other. Therefore, it is necessary to irradiate a laser beam on a reverse face of the array board (a lower portion of the drawing shown in each of FIGS. 3A to 3C). Although it is difficult to confirm a pattern of the transparent conductive film from the reverse side of the array board and it is very difficult to accurately estimate a laser beam irradiating position, when the cutting pattern is formed out of a opaque conductive film as explained in the present embodiment, it becomes easy to visualize even from the reverse side of the array board and the laser beam irradiating position can be easily specified.

When a shape of the cutting pattern 9 is formed to be larger than the width of the transparent conductive film in the cutting portion 8, the transparent conductive film in the cutting portion can be positively cut off. Since a common slit size of laser beam irradiation is approximately 20 μm, when a width of the transparent conductive film of the cutting portion is formed to be not more than 20 μm, laser beam cutting can be effectively executed without conducting scanning of the laser beam at the time of laser beam irradiation.

In this embodiment, the cutting pattern 9 is formed out of the conductive film on the same layer as that of the scanning line, however, the cutting pattern 9 may be formed out of the conductive film on the same layer as that of the video signal line. Further, although the cutting pattern 9 is formed via the insulating film 11 and the protective film 12 on a lower layer of the transparent conductive film in the cutting portion 8, the cutting pattern 9 may be formed via one of the films. Alternatively, the cutting pattern 9 may be formed directly on the lower layer of the transparent conduct film.

Second Embodiment

Figure 4:
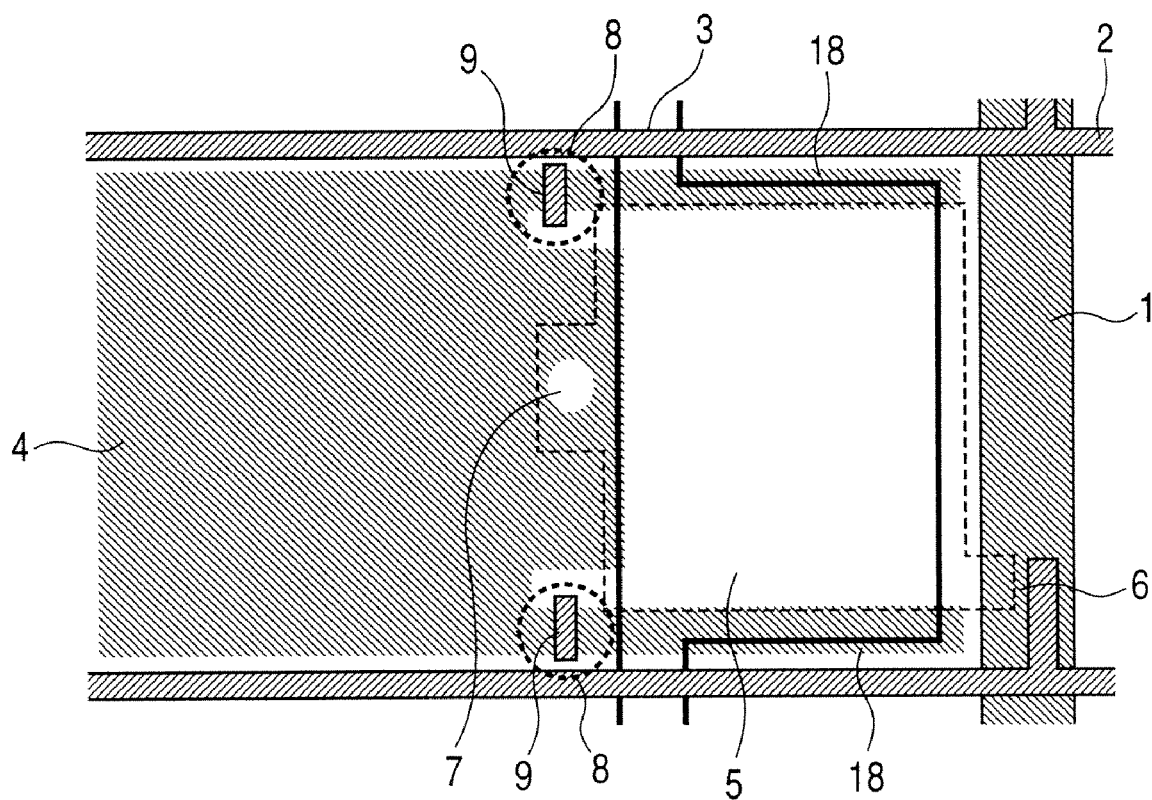
FIG. 4 is a plan view of a substantial one pixel in the Second Embodiment of the present invention.

Referring to FIG. 4, the Second Embodiment of the present invention will be explained below. FIG. 4 is a plan view of substantial one pixel in the Second Embodiment of the present invention. In FIG. 4, like reference characters are used to indicate like parts in FIGS. 1 to 3.

Referring to FIG. 4, different points of Embodiment 2 from Embodiment 1 will be explained below. According to the structure shown in FIG. 4, the transparent conductive film is not substantially formed on the reflecting electrode 5 in the reflecting region to which foreign objects between the panels tend to attach. The reflecting electrode 5 is not exposed. When voltage is impressed upon the liquid crystal layer via the protective film 12 formed on the upper layer, even if no transparent conductive film is formed in the reflecting region, a display of reflection is not affected. In this connection, the structure of this embodiment can be applied to the following case. The effective voltage to be impressed upon the liquid crystal 16 in the reflecting region is not the effective voltage given by the transparent conductive film on the uppermost layer in the reflecting region but the effective voltage to be impressed upon the liquid crystal 16 is a voltage to be impressed upon the liquid crystal given via the protective film 12 by the reflecting electrode 5. Even in the above case, a big difference on the display is not caused between the voltage and the effective voltage impressed upon the liquid crystal by the transmitting region and no problems are caused in the quality of the display. To this case, the above structure can be applied. However, when the transparent conductive film is removed from all the surface of the reflecting region, a region in which a normal pixel voltage is not impressed is increased along the video signal line 2. Accordingly, there is a possibility that a defective display is caused. Therefore, it is preferable that an extending portion 18 of the transparent conductive film is formed even in the reflecting region as shown in FIG. 4 in the region located along the common wiring 3. Even in this case, as shown in FIG. 4, at two positions where the cutting portion 8 as a connecting portion exists at which the extending portion 18 of the transparent conductive film in the reflecting region and the pixel electrode 4 as the transparent conductive film in the transmitting region are connected to each other, the cutting pattern 9 is formed. Due to the foregoing, in the case where a short-circuit occurs between the extending portion 18 of the transparent conductive film and the counter electrode of the color filter board, repairing of the defective portion can be more positively conducted. When the above structure is adopted, the defect of a short-circuit caused by foreign objects between the panels can be further reduced.

In this connection, the display device of the embodiment of the present invention is not only applied to a semi-transmission type display device in which the liquid crystal is used but also applied to a full transmission type display device and a full reflection type display device. That is, the display device of the embodiment of the present invention can be applied to all types of display devices in which the transparent conductive film such as ITO is used.

What is claimed is:
1. A display device having a pixel including a transmitting region to transmit light and a reflecting region comprising a reflecting electrode to reflect external light, the display device comprising:
 a transparent conductive film including
  a first transparent conductive film forming a pixel electrode in the transmitting region,
  a second transparent conductive film provided above the reflecting electrode, and
  a connecting portion integrally formed with and connecting the first transparent conductive film and the second transparent conductive film; and an opaque conductive film provided below the transparent conductive film, independently provided from the reflecting electrode, and located below the connecting portion, wherein the opaque conductive film is disposed below the pixel electrode in the transmitting region.

2. The display device according to claim 1, wherein a width of the transparent conductive film at the connecting portion above the opaque conductive film is less than or equal to 20 µm.

3. The display device according to claim 1, wherein a width of the opaque conductive film is larger than a width of a pattern of the connecting portion.

4. The display device according to claim 1, further comprising:
    a cutting pattern formed of the opaque conductive film.

5. The display device according to claim 1, wherein the opaque conductive film is disposed to cut off the transparent conductive film and the opaque conductive film at the connecting portion by irradiating a laser beam at the same time.

6. The display device according to claim 1, wherein at least one of an insulating film and a protective film is formed between the opaque conductive film in the connecting portion and the transparent conductive film.

7. A method of repairing a display device, the display device having a pixel including a transmitting region to transmit light and a reflecting region comprising a reflecting electrode to reflect external light, the display device comprising a transparent conductive film including a first transparent conductive film forming a pixel electrode in the transmitting region, a second transparent conductive film provided above the reflecting electrode, a connecting portion integrally formed with and connecting the first transparent conductive film and the second transparent conductive film; and an opaque conductive film provided below the transparent conductive film, independently provided from the reflecting electrode, and located below the connecting portion, wherein the opaque conductive film is disposed below the pixel electrode in the transmitting region, and the method of repairing the display device comprises:
    cutting the connecting portion by irradiating a laser beam.

8. The method according to claim 7, wherein a width of the transparent conductive film at the connecting portion above the opaque conductive film is less than or equal to 20 µm.

9. The method according to claim 7, wherein a width of the opaque conductive film is larger than a width of a pattern of the connecting portion.

10. The method according to claim 7, wherein the display device further comprises an insulating board having a first face on which the opaque conductive film is formed, and the laser beam is irradiated from a second face of the insulating board opposite to the first face.

11. The method according to claim 7, wherein a cutting pattern is formed from the opaque conductive film.

12. The method according to claim 7, wherein the transparent conductive film and the opaque conductive film at the connecting portion are cut off at the same time.

* * * * *